United States Patent [19]
Ataka et al.

[11] Patent Number: 5,939,202
[45] Date of Patent: Aug. 17, 1999

[54] MAGNETIC RECORDING MEDIUM AND METHOD FOR MANUFACTURING THE SAME

[75] Inventors: Toyoji Ataka; Keiji Ohkubo; Noboru Kurata; Naoki Takizawa; Kazuo Enomoto, all of Nagano, Japan

[73] Assignee: Fuji Electric Co., Ltd., Japan

[21] Appl. No.: 08/944,538

[22] Filed: Oct. 7, 1997

[30] Foreign Application Priority Data

Oct. 7, 1996 [JP] Japan ................................... 8-266061

[51] Int. Cl.$^6$ ....................................................... G11B 5/66
[52] U.S. Cl. ................... 428/457; 428/694 ST; 428/694 TS; 428/900; 427/128; 427/131; 204/192.2; 204/192.5
[58] Field of Search ............................. 428/457, 694 ST, 428/694 TS, 900; 427/128, 131; 204/192.2, 192.5

[56] References Cited

U.S. PATENT DOCUMENTS

| | | | |
|---|---|---|---|
| 4,471,017 | 9/1984 | Poeschel | 428/215 |
| 5,516,380 | 5/1996 | Darolia et al. | 148/409 |
| 5,800,931 | 9/1998 | Lee et al. | 428/611 |

OTHER PUBLICATIONS

"Effects of Cr Intermediate Layers on CoCrPt Thin Film Media on NiAl Underlayers", Li–Lien Lee et al., IEEE Transactions on Magnetics, vol. 31, No. 6, Nov. 1995.

*Primary Examiner*—Stevan A. Resan
*Attorney, Agent, or Firm*—Rossi & Associates

[57] ABSTRACT

A magnetic recording medium is provided which includes a non-magnetic base, and a non-magnetic metal base layer, a magnetic layer, and a protective layer, which are laminated in the order of description on the non-magnetic base, wherein the non-magnetic metal base layer is formed from an alloy film in which at least one element selected from the group consisting of W, Ta, Hf, Mo, Cr, Zr and Nb is added to NiAl.

8 Claims, 11 Drawing Sheets

30.0 nm 30.0 nm

MAGNETIC RECORDING MEDIUM AND METHOD FOR MANUFACTURING THE SAME

FIELD OF THE INVENTION

The present invention relates to a magnetic recording medium used in a storage device, such as a fixed magnetic disc device, which utilizes magnetic recording, and also relates to a method for manufacturing such a magnetic recording medium.

BACKGROUND OF THE INVENTION

FIG. 1 is a schematic cross sectional view showing the film structure of a typical example of known magnetic recording medium. In this recording medium, a first base layer 2 made of Ni—P, Al or the like is formed on a substrate 1 made of glass, Al or the like, to provide a base 11, on which are formed a second base layer 3, a single magnetic layer 4 (formed of CoCrPtB or CoCrPtTa, for example), and a protective layer 5 made principally of C. Further, a lubricant layer 6 consisting of a liquid lubricant is formed on the protective layer 5. To produce such a recording medium, the first base layer 2 formed from a Ni—P or Al film is formed by a wet film-forming process, such as electroless plating, or a dry process, such as sputtering in a vacuum, or vapor deposition, on a surface of the non-magnetic substrate 1 which is made of a glass material or Al alloy, for example, and is machined to achieve required degrees of parallelism, flatness and surface roughness, so as to provide the base 11. The base 11 is then processed again by mechanical texture machining and/or laser texture machining, to achieve desired degrees of flatness and surface roughness. The surface of the base 11 is then brought into a purified condition by cleaning, for example. Subsequently, the base 11 is heated to 50–300° C. in a vacuum, and the second base layer 3 made of Cr and having a film thickness of about 50 nm, magnetic layer 4 made of CoCrPtTa whose major component is Co and having a film thickness of about 30 nm, and the protective layer 5 made principally of C and having a film thickness of about 10 nm are formed by dc sputtering on the surface of the base 11, while a dc bias voltage of about −200 V is being applied to the base. Then, the protective layer 5 is coated in the atmosphere with a fluorocarbon containing liquid lubricant which provides the lubricant layer 6 having a film thickness of 1 nm. In this manner, the magnetic recording medium is produced. The recording medium thus produced exhibits good mechanical characteristics, such as strength and dimensional accuracy, causing no problems in practical use, and also exhibits good magnetic characteristics. More specifically, the coercive force (Hc) is about 2000 Oe, and the product (Brt) of the residual magnetic flux density and the film thickness is about 150 G$\mu$m. The slope (S*) of the magnetization curve in the vicinity of Hc is about 0.85, which is also favorable.

If the second base layer 3 of the above recording medium is divided into an NiAl layer as a first layer, and a Cr layer as a second layer, and the magnetic layer 4 is formed of CoCr$_{10}$Pt$_{15}$ (at. %) entirely by rf sputtering, the resulting recording medium provides a high coercive force (Hc) of 3000 Oe or higher (refer to Li-Lien Lee et. al.: IEEE Trans. Magn., 31, 2728 (1995)).

The present invention is concerned with a technique for further improving the above-described magnetic recording medium.

To meet with a recent requirement for processing of a large amount of information whose volume and diversity are rapidly increased, the fixed magnetic disc device is strongly desired to provide a high recording density and a large capacity. To this end, the magnetic recording medium used in the magnetic disc device is desired to have a high linear recording density, reduced noise (N), and good electromagnetic conversion characteristics. To reduce the noise, magnetic particles of the magnetic layer need to have a relatively small particle size and a relatively high degree of magnetic isolation (refer to M. Takahashi, et al: EEE Trans. Magn., 31, 2833 (1995)), and the coercive force (Hc) needs to be increased to a certain extent in order to maintain a high linear recording density.

Further, there is a need to manufacture a large quantity of magnetic recording media so as to lower the cost per product, while assuring a high percentage of non-defectives (yield). To this end, it is desirable to employ a further simplified method for manufacturing the recording media.

SUMMARY OF THE INVENTION

It is therefore an object of the present invention to provide a method of manufacturing a magnetic recording medium having a high coercive force (Hc) of about 4k Oe, small particle size and high degree of magnetic isolation of its magnetic particles, in a process similar to a known method, or in a more or less simplified process, which method is used for stably manufacturing a large quantity of recording media having a high linear recording density and reduced noise.

To accomplish the above object, the present invention provides a magnetic recording medium which includes a non-magnetic metal base layer, a magnetic layer, and a protective layer, which are laminated in the order of description on a non-magnetic base, wherein the non-magnetic metal base layer comprises an alloy film formed by adding at least one element selected from the group consisting of W, Ta, Hf, Mo, Cr, Zr and Nb, to NiAl.

The alloy film of the above-indicated non-magnetic metal base layer preferably has a composition represented as Ni$_x$Al$_{1-x-y}$Z$_y$, where x=0.05–0.3, y=0.01–0.08: atomic concentration, Z is the at least one element selected from the group consisting of W, Ta, Hf, Mo, Cr, Zr and Nb, and y is a sum of atomic concentrations of all of the at least one element.

In a method for manufacturing a magnetic recording medium according to another aspect of the invention a non-magnetic metal base layer, a magnetic layer, and a protective layer are laminated in the order of description on a non-magnetic base.

In the above method, the non-magnetic metal base layer is preferably formed by dc sputtering, and the magnetic layer is preferably formed by rf sputtering.

BRIEF DESCRIPTION OF THE DRAWINGS

The invention will be described in greater detail with reference to a certain preferred embodiment thereof and the accompanying drawings, wherein.

DETAILED DESCRIPTION OF THE INVENTION

Figure 1:
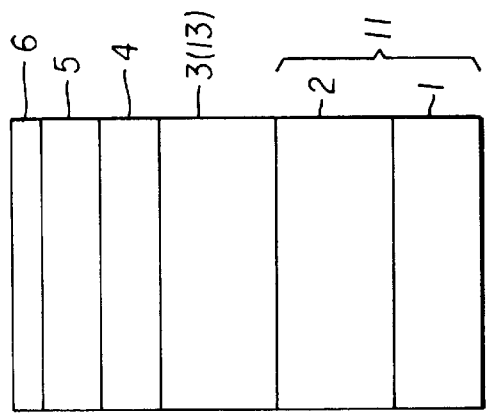
FIG. 1 is a schematic cross sectional view showing the construction of a conventional magnetic recording medium.

The magnetic recording medium according to the present invention includes a single, non-magnetic metal base layer formed of a special composition. In the recording medium of the invention, non-magnetic metal base layer 13, magnetic layer 4 and protective layer 5 are formed or laminated in this order on base 11 by sputtering or vapor deposition as in the known example shown in FIG. 1. The non-magnetic metal base layer 13 is formed from an alloy film obtained by adding at least one element selected from W, Ta, Hf, Mo, Cr, Zr and Nb to NiAl. The composition of the alloy film is $Ni_xAl_{1-x-y}Z_y$ (x=0.05–0.3, y=0.01–0.08: atomic concentration).

The base 11 may be a glass substrate, or may include a Cr thin film or a Cr/Al thin film formed on a surface of a glass substrate.

In producing the recording medium as described above, dc sputtering is used for forming the non-magnetic metal base layer 13, and rf sputtering is used for forming the magnetic layer 4. Although a sufficiently high coercive force of about 4 k Oe may be obtained even if no bias voltage is applied to the substrate during dc sputtering, the coercive force (Hc) may be further increased if a certain bias voltage is applied to the substrate.

In the above manner, a magnetic recording medium having a high linear recording density and maintaining low noise can be produced. In addition, a large quantity of such high-quality recording media can be manufactured with high stability.

EXAMPLES

Example 1

After a non-magnetic substrate made of glass and having suitable degrees of parallelism, flatness and surface roughness is heated to a suitable temperature by a lamp heater in a vacuum, a non-magnetic metal base layer is formed by dc sputtering on the surface of the substrate, and a magnetic layer is then formed by rf sputtering on the base layer. In this example, the first base layer as used in the known example of FIG. 1 may not be formed, or a Cr layer may be formed as the first base layer. The conditions under which the above layers are formed are shown in TABLE 1 below. To describe the film structure, the indication such as "Glass/dc 40 nm Cr (0 V)/(atmosphere exposure)/dc about 70 nm NiAlZ (−200 V)/rf about 20 nm CoCrPtB (0 V)" represents a specimen obtained in the following manner. Namely, a 40 nm-thickness Cr film is formed on a glass substrate by dc sputtering with no bias voltage (0 V) applied to the substrate, once exposed to the atmosphere and then exhausted, and about 70 nm-thickness NiAlZ film is formed on the Cr film by dc sputtering with a bias voltage of −200 V applied to the substrate. Then, about 20 nm-thickness CoCrPtB film is formed on the NiAlZ film by rf sputtering while no bias voltage (0 V) is applied to the substrate.

TABLE 1

| Film Forming Conditions | |
|---|---|
| Ultimate vacuum | <1.5 × 10<sup>−4</sup> Pa |
| Substrate temperature before film formation | = about 150° C. |
| Source gas | : Ar |
| Gas pressure during film formation | = 0.65 Pa |
| Bias voltage applied to substrate | = 0 V |
| Base | : reinforced glass substrate |
| Target for base layer | : $Ni_{50.2}Al$ (at. %): diameter 152 mm |
| Target for magnetic layer | : $CoCr_{13}Pt_{10}B_5$ (at %) |
| Chips mounted on NiAl target: | |
|   W, Pt, Si, Hf: | : diameter 10 mm |
|   Cu | : 10 mm square |
|   V, Ta, Ti, Cr, Al, Nb, Ag: | diameter 5 mm |
|   Ni, Mo, Zr, Fe, Co: | 5 mm × 11 mm × 1 mm |
| NiAlZ alloy deposition speed | = about 2–4 nm/s |
| Co alloy deposition speed | = about 1–2 nm/s |

Figure 2:
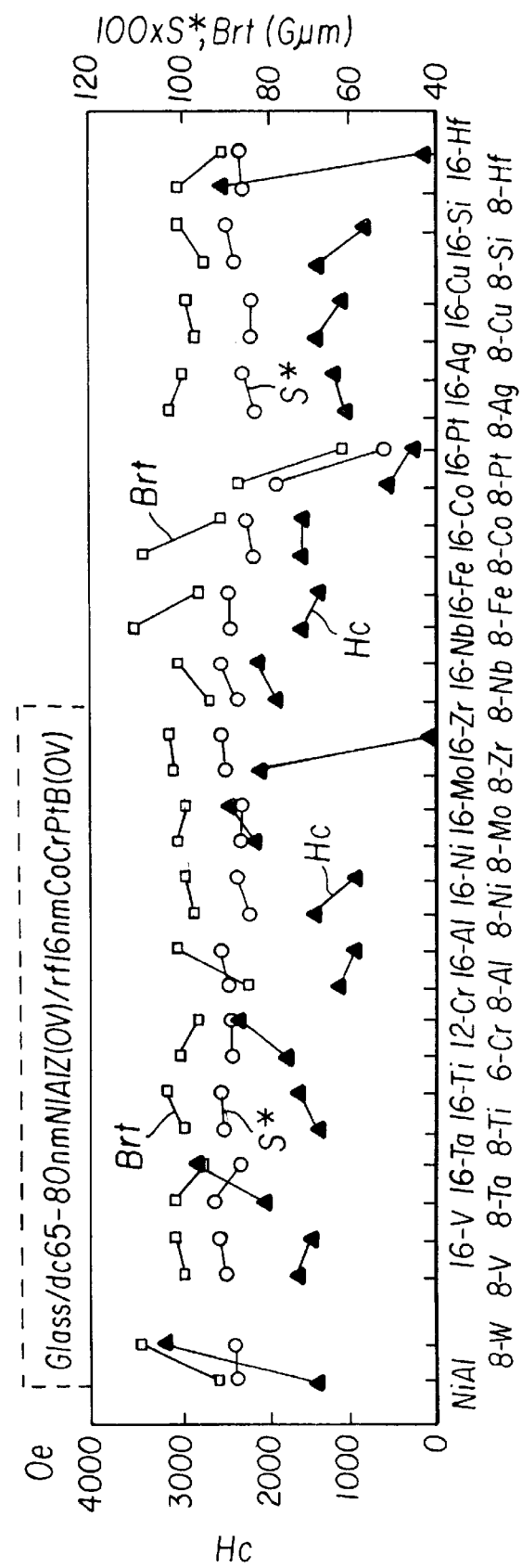
FIG. 2 is a graph showing magnetic characteristics of magnetic recording media in each of which a NiAlX composite target is used.

The graph of FIG. 2 shows Hc, Brt and S* (100×S* in the graph) with respect to specimens having the film structure as represented by Glass/dc about 70 nm (actually 65–80 mm) NiAlZ (0 V)/rf about 16 nm CoCrPtB (0 V), where 6 to 16 chips of each of the above elements are mounted on a NiAl target. Where only NiAl is used for forming the non-magnetic metal base layer, the coercive force (Hc) is about 1500 Oe, as shown at the left end of the graph of FIG. 2. The coercive force (Hc) increases if chips of W, Ta, Hf, Mo, Cr, Zr or Nb are added to the NiAl target. In particular, where a composite target in which 8 W chips, 16 Ta chips or 8 Hf chips are added is used, the coercive force (Hc) becomes 2800 Oe or higher. Although Brt (the product of the residual magnetic flux density and the film thickness) and S* (slope of the magnetization curve around Hc) are remarkably reduced where 16 Pt chips are added to the NiAl target, these characteristics do not depend upon the kind and number of chips added to the NiAl target in the other cases. Generally, Brt is in the range of about 80–110 G$\mu$m, and S* is in the range of about 0.80 to 0.90.

Figure 3:
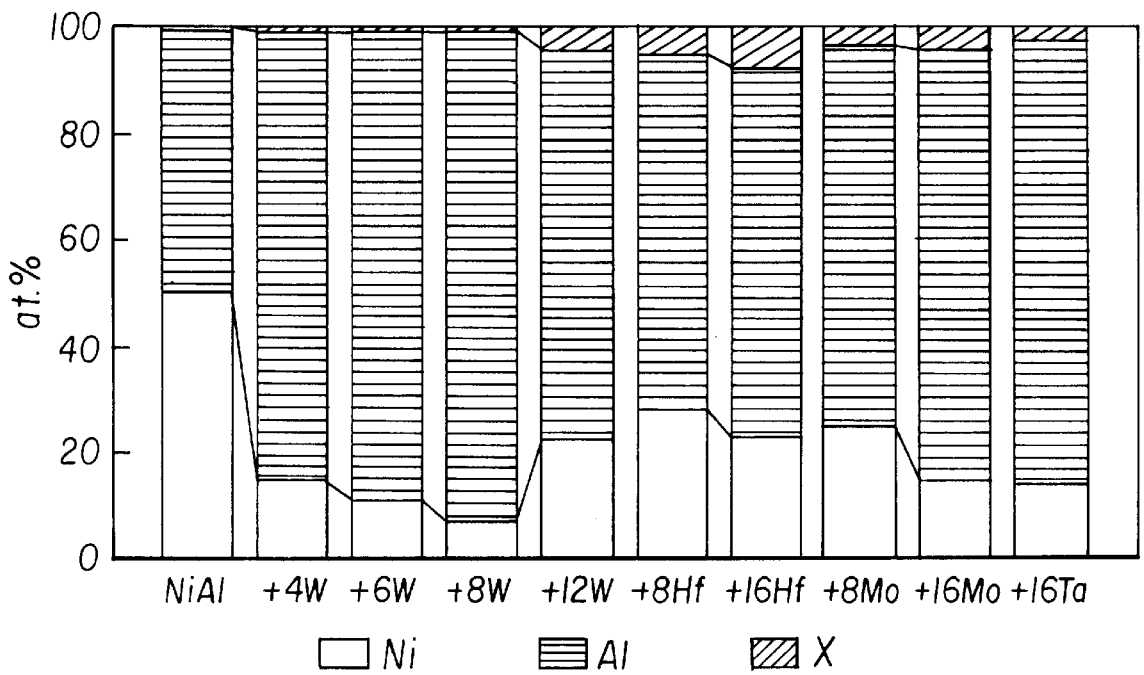
FIG. 3 is a graph showing the relationship between the kind and amount of target (X) added to NiAl, and the composition of NiAlX film.

FIG. 3 shows the relationship between the composition of NiAl (Z being selected from W, Hf, Mo and Ta) film, and the condition (the number of Z chips added to NiAl) under which the composite target is formed. It will be understood from FIG. 3 that the film (non-magnetic metal base layer) has a large content of Al when W chips are added, and has the largest content of Al when 8 W chips are added. The W content is 10 at. % or smaller, though it increases as the number of W chips added to the target increases. The contents of Hf, Mo, Ta increase as the number of chips of respective elements is increased. Referring to the areas of chips as indicated in TABLE 1 above, Hf and Ta chips provide larger contents thereof than W chips having the same chip area, and the content of Mo is about the same as that of W. By increase the number of Hf chips, the content of Al does not significantly change, but the content of Ni is reduced.

Figure 4:
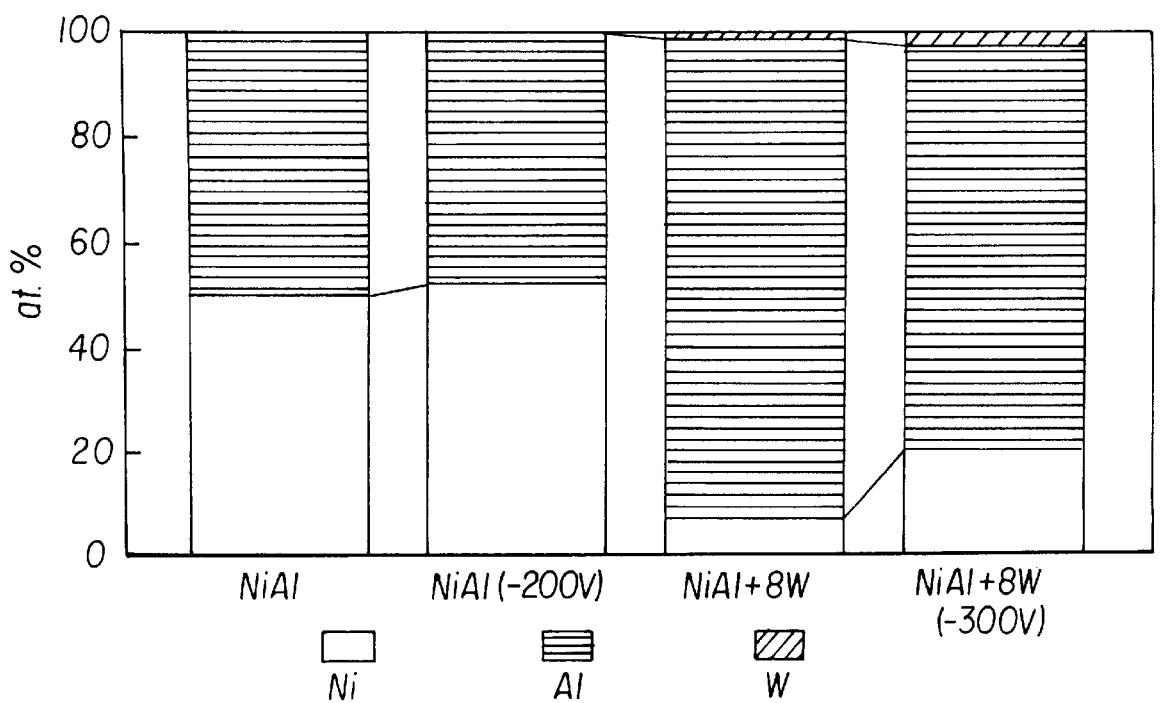
FIG. 4 is a graph showing the relationship between the bias voltage applied to the substrate, and the compositions of NiAl base film and NiAlW base film.

In addition, influences of voltage applied to the substrate during film formation on the film composition of NiAl film and NiAlW film were examined, and the results are shown in FIG. 4. In the case of NiAl film, no significant changes in the contents of Ni and Al are observed, namely, the composition of NiAl film does not depend on the presence or absence of the bias voltage. In the case of NiAlW film, on the other hand, W and Ni are increased and Al is reduced if a bias voltage is applied, and the resulting composition becomes close to that of NiAl +12 W with no bias voltage applied. This may be because of the effect of reverse sputtering, for example.

Example 2

In view of the fact that the coercive force (Hc) is increased to the largest level by addition of 8 W chips, variations in the magnetic characteristics, film composition and crystal structure were examined with respect to NiAlW base films formed under the conditions as in Example 1 wherein the number of W chips was changed from 0 to 4, 6, 8, 10 and 12.

Figure 5:
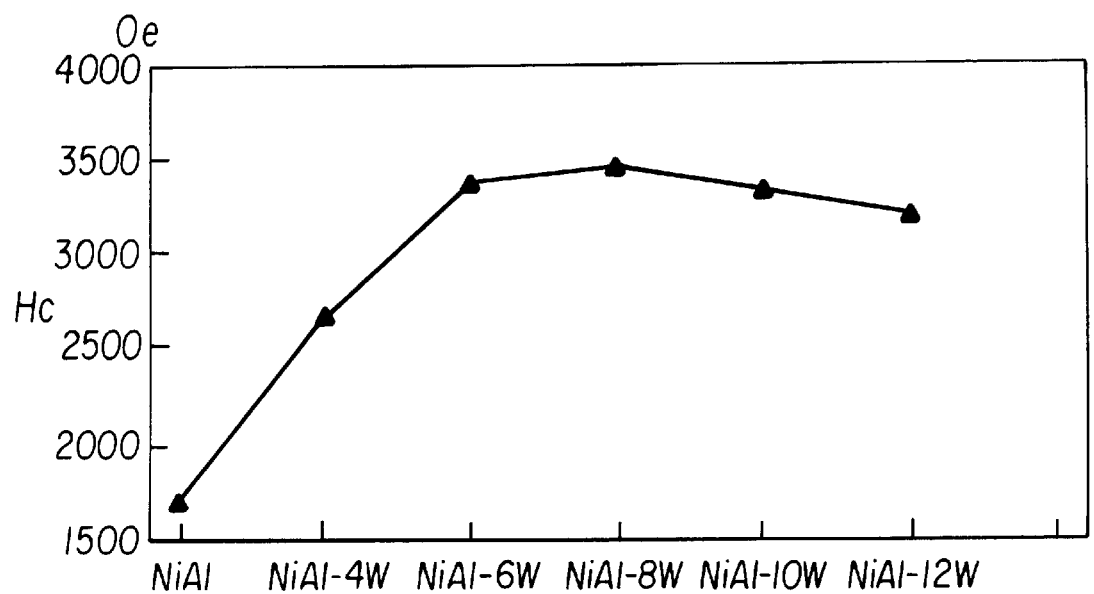
FIG. 5 is a graph showing the relationship between the composition of NiAlW film and Hc.
Figure 6:
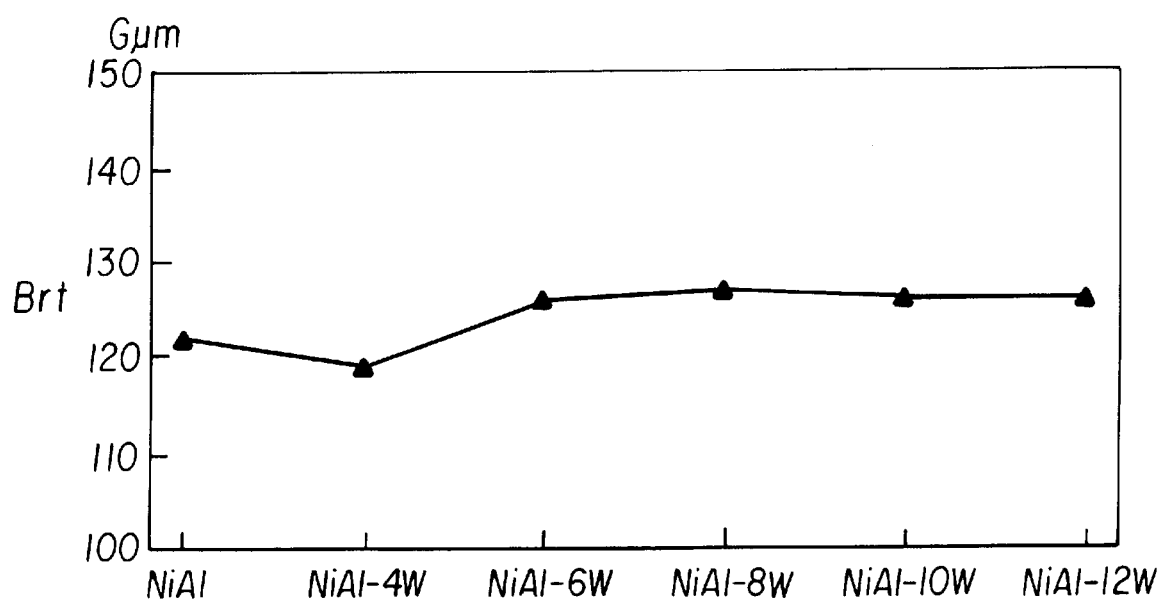
FIG. 6 is a graph showing the relationship between the composition of NiAlW film and Brt.
Figure 7:
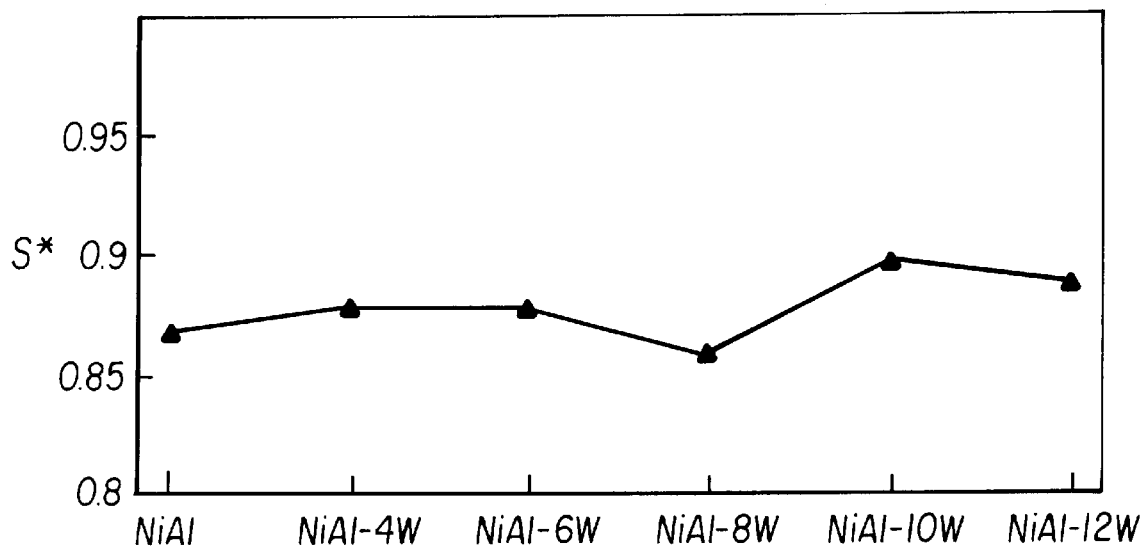
FIG. 7 is a graph showing the relationship between the composition of NiAlW film and S*.

(1) Dependence of magnetic characteristics on the composition of NiAlW base film The graphs of FIGS. 5, 6 and 7 show Hc, Brt and S*, respectively, of specimens of Glass/dc about 79 nm NiAl (0 V)/rf about 20 nm CoCrPtB (0 V) films where 4 to 12 W chips are deposited on respective NiAl targets. The coercive force (Hc) is about 1700 Oe where no W chip is added, reaches its maximum value, namely, about 3400 Oe, when 6 to 10 W chips are added, and tends to be slightly reduced from the maximum where 12 W chips are added. Brt and S* do not largely depend on the number of chips, and are kept at about 120 G$\mu$m and 0.88, respectively.

As is understood from the above results, the composition of the non-magnetic metal base layer is desirably in the range of: 0.05–0.3 at. % of Ni, 0.65–0.96 at. % of Al, and 0.01–0.08 at. % of W. Desirable ranges of Ta, Hf, Mo, Cr, Zr in the composition are substantially equal to that of W.

Figure 8:
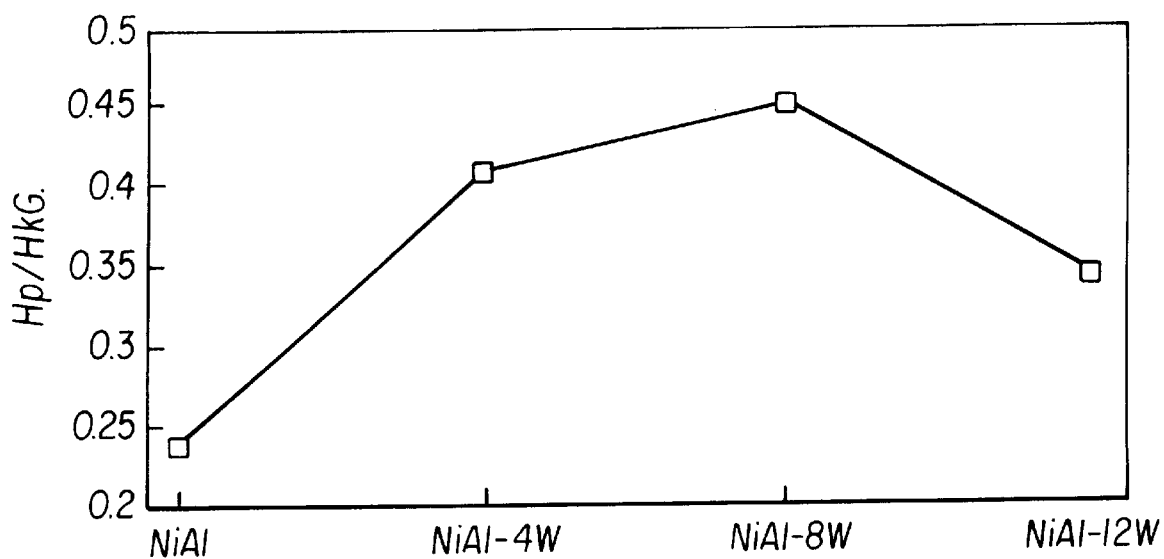
FIG. 8 is a graph showing the relationship between the composition of NiAlW film and the ratio Hp(HkG.

The graph of FIG. 8 shows the relationship between the composition of NiAlW film, and the ratio of Hp to HkG. (Hp/HkG.) calculated from rotational hysteresis loss (torque analysis). Hp represents remanence coercivity (coercive force determined by irreversible reversal of magnetization), which is determined by a magnetic field at the peak of the rotational hysteresis loss. HkG. represents a magnetic field where the rotational hysteresis loss disappears, which is almost identical with an anisotropic magnetic filed in crystal grains. HkG does not depend on the orientation of the crystal grains and the magnetization reversing mechanism in the grains. The Hp/HkG. increases as the number of W chips increases from 0, reaches the maximum value, i.e., 0.45, when 8 W chips are added, and then decreases if the number of W chips is further increased. Thus, Hp/HkG. reaches its maximum in the case of 8 W chips, which means that the NiAlW film with 8 W chips has a weak magnetic interaction between magnetic grains, namely, a high degree of magnetic isolation or separation.

(2) Correlation with Crystal Structure Analysis

Figure 9:
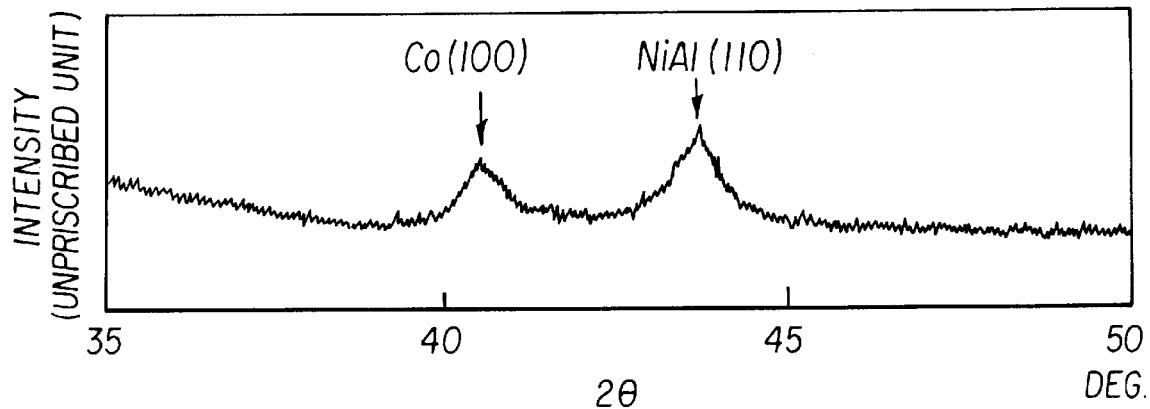
FIG. 9 is a graph showing a X-ray diffraction pattern of Gl./NiAlW/CoCrPtB film.
Figure 10:
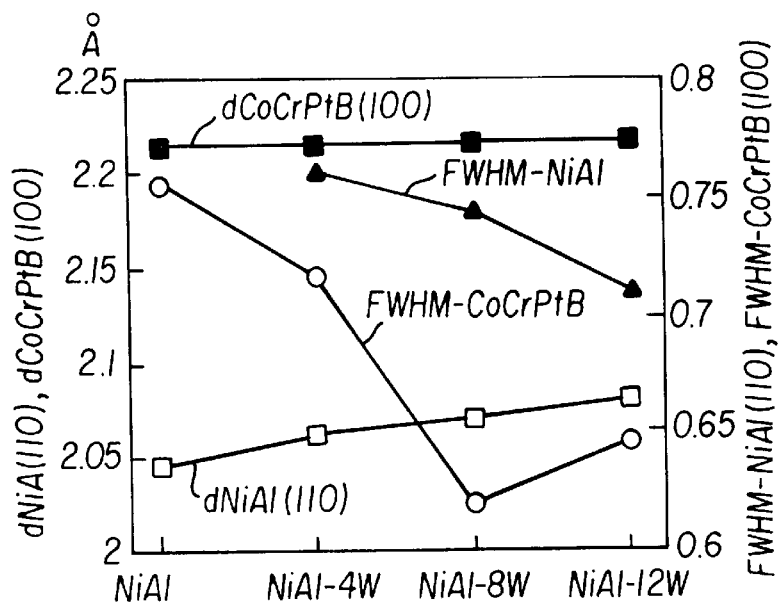
FIG. 10 is a graph showing the results of measurements of X-ray diffraction in relation to the number of W chips added to NiAl film.

FIG. 9 shows an X-ray diffraction pattern according to $\theta$–2$\theta$ method where eight W chips were added to NiAl target. As shown in this figure, NiAl (110) plane and CoCrPtB (100) plane are oriented in parallel with the film surface. FIG. 10 shows the spacings dNiAl (110), dCoCrPtB (100) of the NiAl (110) plane and CoCrPtB(100) plane, and the full width at half maximum FWHM-NiAl (110), FWHM—CoCrPtB (100) of NiAl (100) and CoCrPtB (100) at its peaks in the X-ray diffraction pattern, in relation to the number of W chips. The spacing dNiAl (110) is about 2.046 Å in the case of no W chip, and monotonously increases as the number of W chips is increased. Namely, dNiAl (110) is 2.071 Å in the case of 8 W chips, and 2.081 Å in the case of 12 W chips. The spacing dCoCrPtB (100) hardly changes as the number of W chips changes from 0 to 12. Although the FWHM of NiAl (110) cannot be accurately measured in the case of chip because of a low peak intensity and superposition of CoCrPtB (002) on NiAl (110), for example, this FWHN-NiAl monotonously decreases from 0.762 deg. to 0.711 deg. as the number of chips increases from 4 to 12. This may be because the grain size of NiAl is slightly increased, or the lattice distortion is reduced. On the other hand, the FWHM of CoCrPtB (100) is 0.756 deg. in the case of 0 chip, decreases to 0.621 deg. as the number of chips increases to 8 chips, and then slightly increases to 0.647 deg. as the number of chips increases to 12 chips. It may be considered that CoCrPtB has the largest grain size or reduced lattice distortion when 8 W chips are added.

Figure 11:
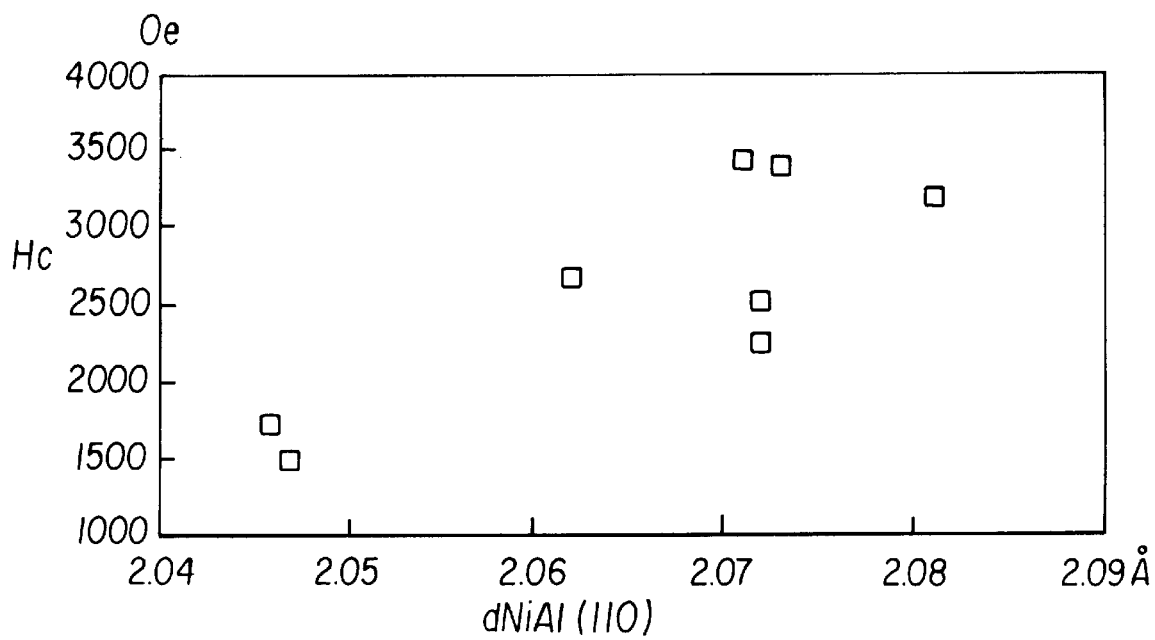
FIG. 11 is a graph showing the relationship between Hc and dNiAl (110)
Figure 12:
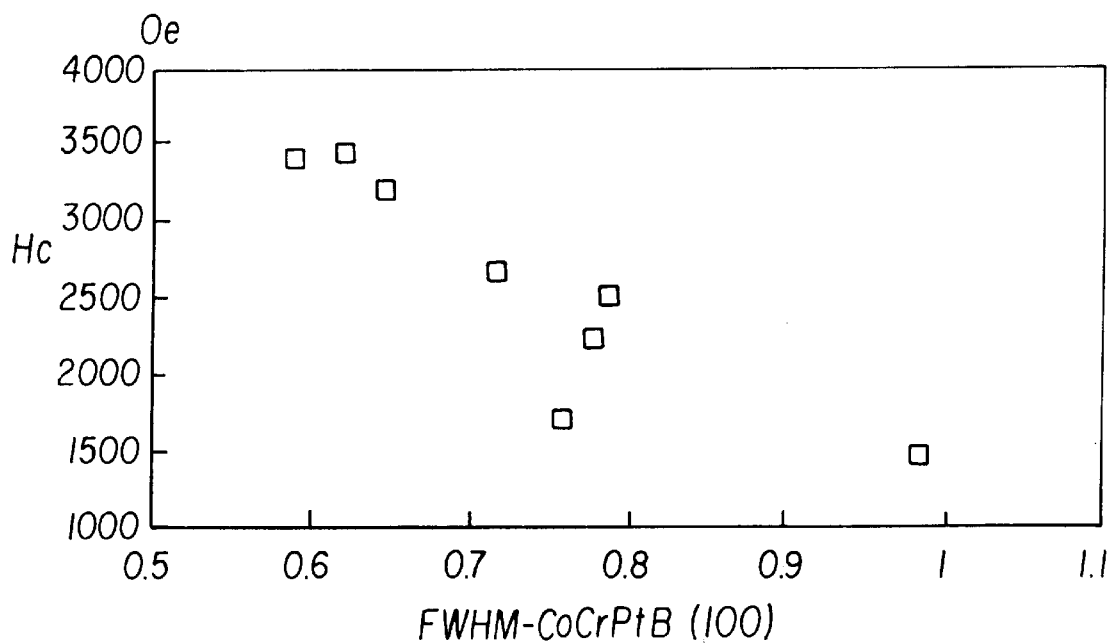
FIG. 12 is a graph showing the relationship between Hc and FWHM—CoCrPtB (100)

The graphs of FIGS. 11, 12 show values of Hc with respect to dNiAl (110) and FWHM—CoCrPtB (100) in FIG. 10, which are taken along the axis of abscissa in FIGS. 11, 12, respectively. The coercive force (Hc) tends to increase as dNiAl (110) increases, as shown in FIG. 11, and tends to increase as FWHM—CoCrPtB (100) is reduced, as shown in FIG. 12. Namely, the coercive force (Hc) may be increased because dNiAl (110) is increased with an increase of W chips, and the crystal characteristics of the CoCrPtB layer is improved (increased crystal grain size or reduced lattice distortion).

Figure 13:
FIG. 13 is a photographic view of Glass/dc 50 nm NiAl (0 V)/rf 15 nm CoCrPtB (0 V) film as observed with a transmission electron microscope.
Figure 14:
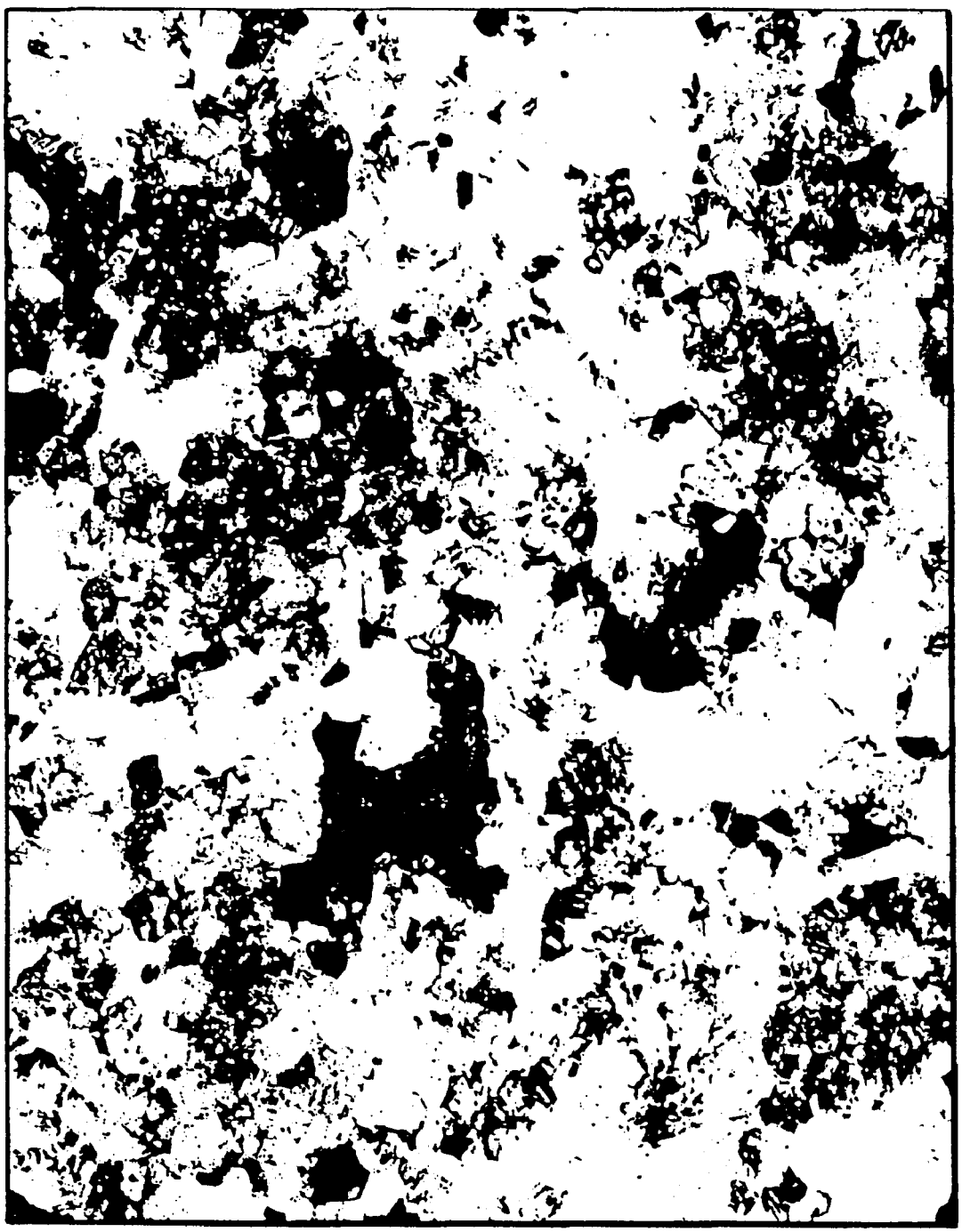
FIG. 14 is a photographic view of Glass/Cr/dc Cr (−200 V)/dc CoCrPtTa (−200 V) film as observed with the transmission electron microscope.

The grain size of the CoCrPtB film will be now described. FIG. 13 shows a photographic image of Glass/dc 50 nm NiAl 8 W (0 V)/dc 15 nm CoCrPtB (0 V) as observed with a transmission electron microscope (TEM) (magnification of ×300,000). As shown in FIG. 13, the grain size of CoCrPtB was about 100 Å. For comparison with the case where a Cr base layer is employed, FIG. 14 shows a photographic image of Glass/Cr/CoCrPtTa formed from a different magnetic material, under different film-forming conditions, as observed with TEM with the same magnification. The magnetic characteristics of Glass/Cr/CoCrPtTa were such that Hc was equal to 2300 Oe, and Brt was equal to 100 G$\mu$m. Where a known magnetic material was used, the grain size of the magnetic layer was twice or greater that of the grain size of CoCrPtB on the NiAlW base film. No significant difference was observed in the TEM images between the case where no W chip was added and the case where 8 W chips were added.

Example 3

Effect of Applying Bias Voltage to Substrate.

The effect of applying a bias voltage to the substrate during formation of the base layer in Example 2 will be now described. While the films were formed under substantially the same conditions as in Examples 1 and 2, 40 nm-thickness Cr film was initially formed on the substrate made of glass, exposed once to the atmosphere, and exhausted, and then NiAl film and CoCrPtB film were formed on the Cr film on the substrate.

Figure 15:
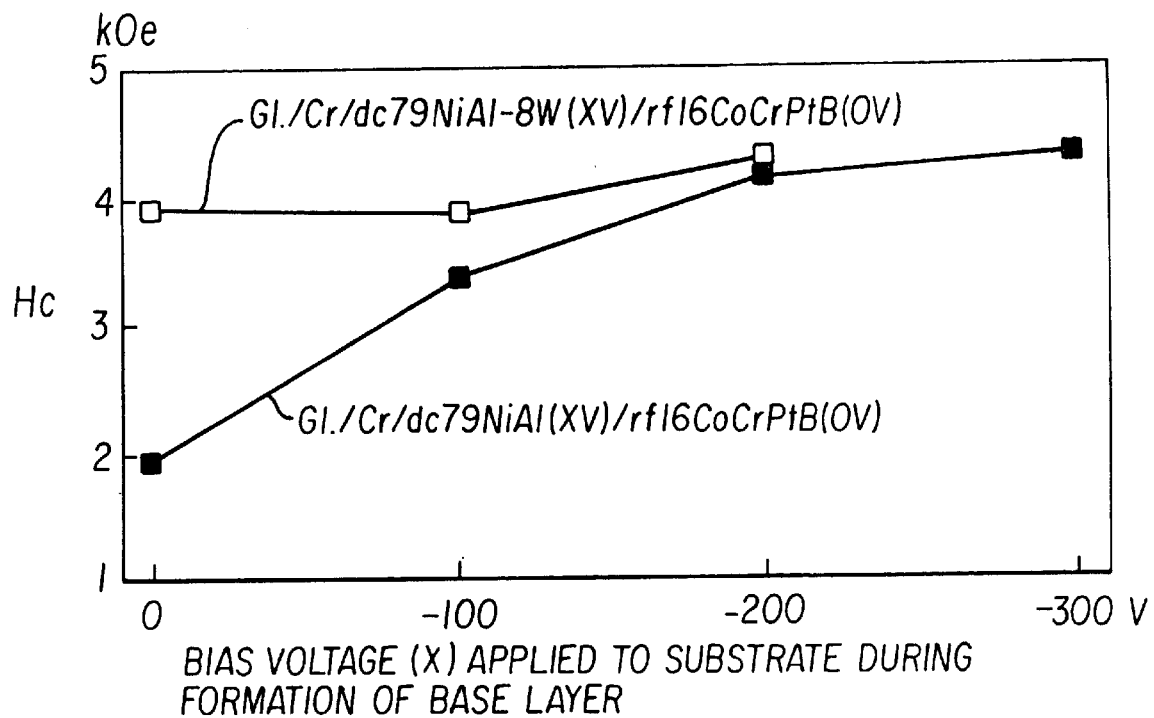
FIG. 15 is a graph showing the relationship between Hc of NiAlW and NiAl films, and the bias voltage applied to the substrate during formation of the base layer.
Figure 16:
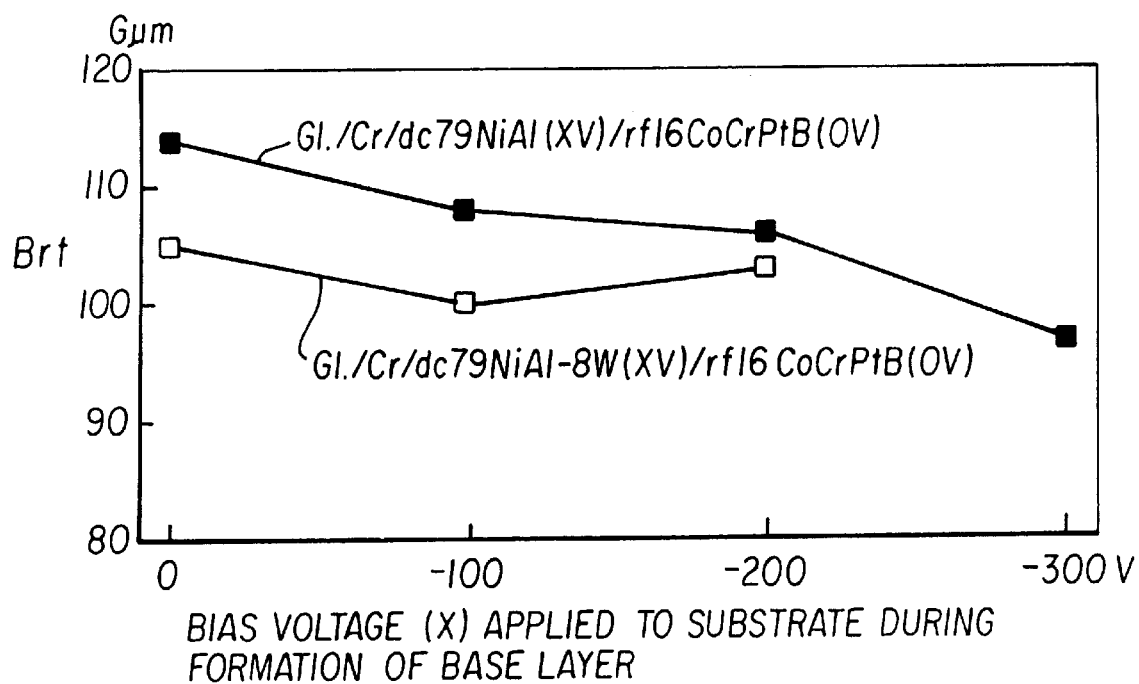
FIG. 16 is a graph showing the relationship between Brt of NiAlW and NiAl films, and the bias voltage applied to the substrate during formation of the base layer.
Figure 17:
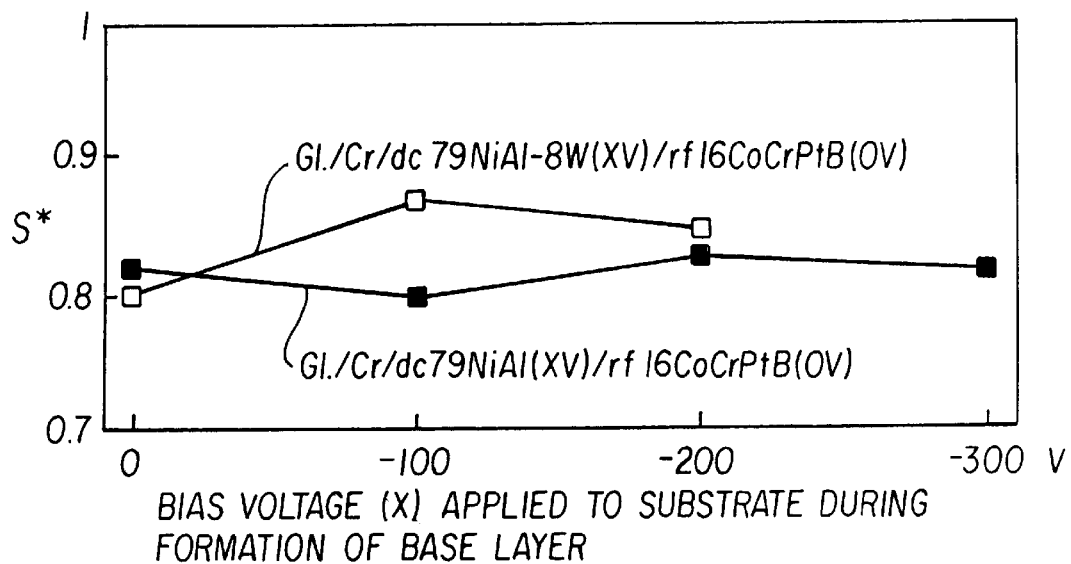
FIG. 17 is a graph showing the relationship between S* of NiAlW and NiAl films, and the bias voltage applied to the substrate during formation of the base layer.

The graphs of FIGS. 15, 16 and 17 show the relationships between Hc, Brt and S* and the bias voltage applied to the substrate during formation of the base layer, with respect to specimens represented as Glass/40 nm Cr/(exposure to the atmosphere)/dc about 79 nm NiAlZ (XV)/rf about 16 nm CoCrPtB (0 V) wherein 0 or 8 W chips are deposited on NiAl target. In both cases, the coercive force (Hc) monotonously increases as the bias voltage applied to the substrate during formation of the base layer increases. In particular, the rate of the increase of Hc in the case of 0 chip is larger than that in the case of 8 W chips, but the largest Hc in the case of 0 chip does not exceed the largest Hc in the case of 8 W chips.

While Brt tends to decrease more or less as the bias voltage applied to the substrate during formation of the base layer decrease where no W chip is used, no significant changes in Brt are observed upon changes of the bias voltage applied to the substrate where 8 W chips are used. S* is substantially in the range of 0.8 to 0.85.

Figure 18:
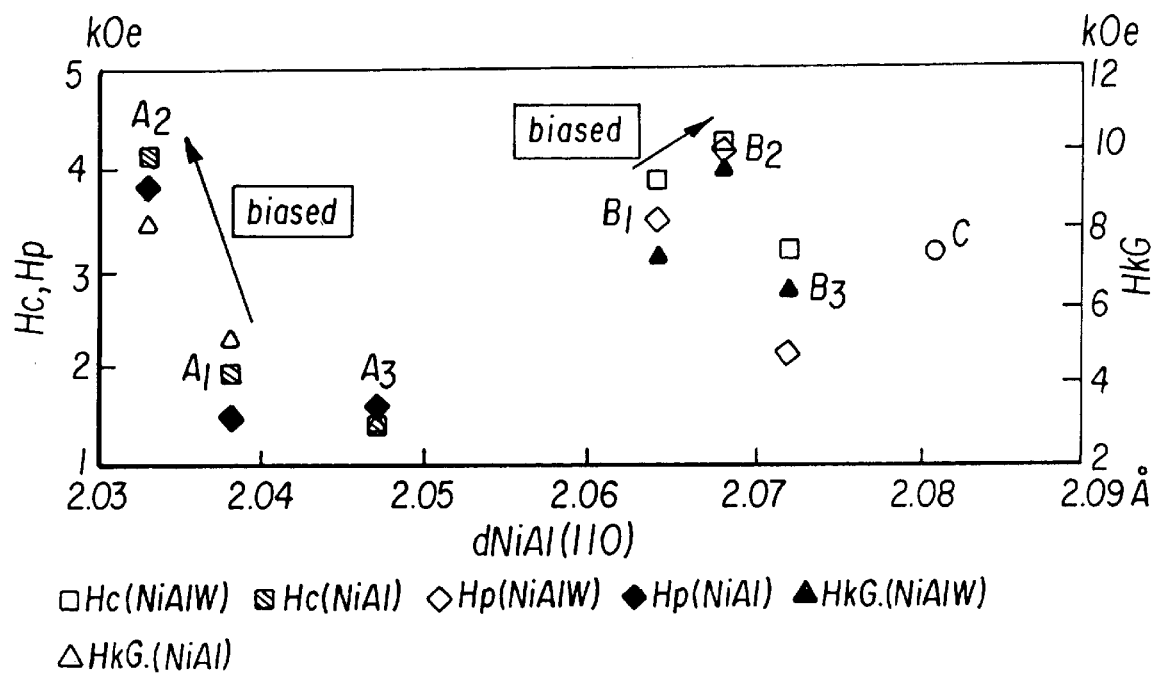
FIG. 18 is a graph showing the relationship between Hc and dNiAl (110) in the cases where a bias voltage is applied to the substrate during formation of the base layer, and where no bias voltage is applied.

In the graph of FIG. 18, the axis of abscissa indicates dNiAl (110) obtained from X-ray diffraction patterns according to θ–2θ method as in Example 2, and the axis of ordinates indicates values of Hc, Hp and HkG, with respect to specimens in which a bias voltage was applied to the substrate during formation of the base layer, and specimens in which no bias voltage was applied to the substrate. In FIG. 18, data groups $A_1$, $A_2$ indicate Hc, Hp, HkG in the cases where no bias voltage (0 V) or -200 V of bias voltage was applied to the substrate, respectively, when producing Glass/Cr/dc 79 nm NiAl (XV)/rf 16 nm CoCrPtB (0 V) of FIGS. 15–17: On the other hand, data groups $B_1$, $B_2$ indicate Hc, Hp, HkG in the cases where no bias voltage (0 V) or -200 V of bias voltage was applied to the substrate, respectively, when producing Glass/Cr/dc 79 nm NiAl 8W (XV)/rf 16 nm CoCrPtB (0 V). Data groups $A_3$ and $B_3$ indicate Hc, Hp, HkG in the cases where no bias voltage (0 V) was applied to a glass substrate on which Cr was not formed, when producing Glass/dc 79 nm NiAl (0 V)/rf 16 nm CoCrPtB (0 V) and Glass/dc 79 nm NiAl 8 W (0 V)/rf 16 nm CoCrPtB (0 V), respectively. In addition, data C represents Hc of Glass/dc 79 nm NiAl 12 W (0 V)/rf 16 nm CoCrPtB (0 V).

In both of the cases of no W chip and 8 W chips, dNiAl (110) was reduced when Cr thin film was formed on the glass substrate, which may be because the NiAl film formed on the Cr film was influenced by the spacing of (110) plane of the Cr film, namely, dCr (110)=2.033A<dNiAl (110). In these cases, the coercive force (Hc) was increased probably due to changes in dNiAl (110), and the effect of keeping the temperature of the substrate during formation of NiAl film and CoCrPtB film, owing to formation of the Cr thin film on the substrate. This is similar to the case where Hc increases if the substrate is heated for a prolonged time. If the composition of NiAl film or NiAlW film is fixed, and a bias voltage is applied to the substrate, Hc increases in a similar manner with respect to both NiAl and NiAlW (Gl./NiAl 12 W (0 V), Gl./Cr/NiAl 8 W (-200 V)), but dNiAl (110) decreases in the former case, and increases in the latter case. Namely, dNiAl (110) of Gl./NiAl 12 W (0 V) is 2.081 Å, while dNiAl (110) of Gl./Cr/NiAl 8 W (-200 V) is 2.068 Å, and its difference is 0.013 Å. In the case of NiAl, on the other hand, the difference is 0.014 Å, which is close to the value obtained in the case of NiAlW films. As a result of the structural analysis of magnetic particles in the plane by means of a grazing incidence X-ray diffraction (GIXD) system, the lattice matching with the upper CoCrPtB layer is such that dCoCrPtB (002) is 2.07366A, while dNiAl (110) is 2.0362Å(misfit 1.8%), and dNiAlW(110) is 2.05182Å (misfit 1.1%). Thus, NiAlW film has slightly better lattice matching with the CoCrPtB layer. This, however, does not necessarily correspond to the results of application of the bias voltage to the substrate or formation of Cr film, and may be because formation of Cr film or application of bias voltage lead to an increased degree of magnetic isolation in CoCrPtB film, due to a getter effect for adsorbing impure gas in an atmosphere in which films are formed, or the effect of limiting or restricting gas emitted from the glass substrate, or the effect of reverse sputtering of Ni, Al, W of the base layer, for example. As is understood from FIG. 18, Hc and other magnetic characteristics change in similar manners in the case where NiAl film is used as the base film, and the case where NiAlW film is used, irrespective of the fact that the lattice distortion of the base film upon application of a bias voltage to the substrate occurs totally reversely, namely, the spacing of NiAl (110) decreases in the case of NiAl film while the spacing increases in the case of NiAlW film. Accordingly, the effect of addition of W may be considered to be caused by a mechanism different from that which causes Hc to be increased in the case of conventional NiAl film. To explain the effect of addition of W, it may be considered that the three-element system including W is accompanied by surface diffusion of W in the NiAlW base film when CoCrPtB film is formed on the base film, and the degassing effect (getter effect) of W, for example, as compared with the NiAl two-element system, though a decisive factor is still unclear. If the results shown in FIGS. 10, 11 are compared with that of FIG. 18, it will be understood that the application of the bias voltage during formation of NiAlW base layer provides a similar effect to that provided by increasing the amount of W.

The following experiments were conducted to confirm that NiAlW film has better lattice matching with CoCrPtB than NiAl film. As indicated in TABLE 2, some specimens of magnetic recording media were produced by varying conditions under which NiAlW base film and NiAl base film were formed, and Hc, and the full width at half maximum at the peak of CoCrPtB (002), i.e., FWHM—CoCrPtB (002), were measured by GIXD system. TABLE 2 indicate the presence of Cr film and the bias voltage applied to the substrate, and also include some examples in which the thickness of the base film was changed, and some examples in which dc sputtering was employed instead of ordinary rf sputtering, for forming the magnetic film.

TABLE 2

| Specimen No. | Base | Thickness (nm) of NiAl (W) film | W chips | Bias voltage (V) applied to substrate |
|---|---|---|---|---|
| 1 | Gl./40 nmCr | 79 | 8 | -200 |
| 2 | Gl./40 nmCr | 79 | 8 | 0 |
| 3 | Gl./40 nmCr | 35 | 8 | 0 |
| 4 | Gl. | 79 | 8 | 0 |

TABLE 2-continued

| | | | | |
|---|---|---|---|---|
| 5 | Gl. | 35 | 8 | 0 |
| 6 | Gl./40 nmCr | 79 | 8 | −200 |
| 7 | Gl./40 nmCr | 79 | 8 | 0 |
| 8 | Gl./40 nmCr | 79 | 0 | −200 |
| 9 | Gl./40 nmCr | 79 | 0 | 0 |
| 10 | Gl./40 nmCr | 35 | 0 | 0 |
| 11 | Gl. | 79 | 0 | 0 |
| 12 | Gl. | 35 | 0 | 0 |
| 13 | Gl./40 nmCr | 79 | 0 | −200 |
| 14 | Gl./40 nmCr | 79 | 0 | 0 |

| Specimen No. | Base | Sputtering type of magnetic film | Hc (Oe) | FWHM-CoCrPtB (002) (degree) |
|---|---|---|---|---|
| 1 | Gl./40 nmCr | rf | 4311 | 2.0726 |
| 2 | Gl./40 nmCr | rf | 3924 | 2.0726 |
| 3 | Gl./40 nmCr | rf | 2508 | 2.0697 |
| 4 | Gl. | rf | 3196 | 2.0741 |
| 5 | Gl. | rf | 1664 | 2.0741 |
| 6 | Gl./40 nmCr | dc | 4119 | 2.077 |
| 7 | Gl./40 nmCr | dc | 3700 | 2.08 |
| 8 | Gl./40 nmCr | rf | 4172 | 2.0712 |
| 9 | Gl./40 nmCr | rf | 1943 | 2.0756 |
| 10 | Gl./40 nmCr | rf | 1625 | 2.0712 |
| 11 | Gl. | rf | 1421 | 2.0741 |
| 12 | Gl. | rf | 1524 | 2.0814 |
| 13 | Gl./40 nmCr | dc | 3652 | 2.077 |
| 14 | Gl./40 nmCr | dc | 1973 | 2.0785 |

Figure 19:
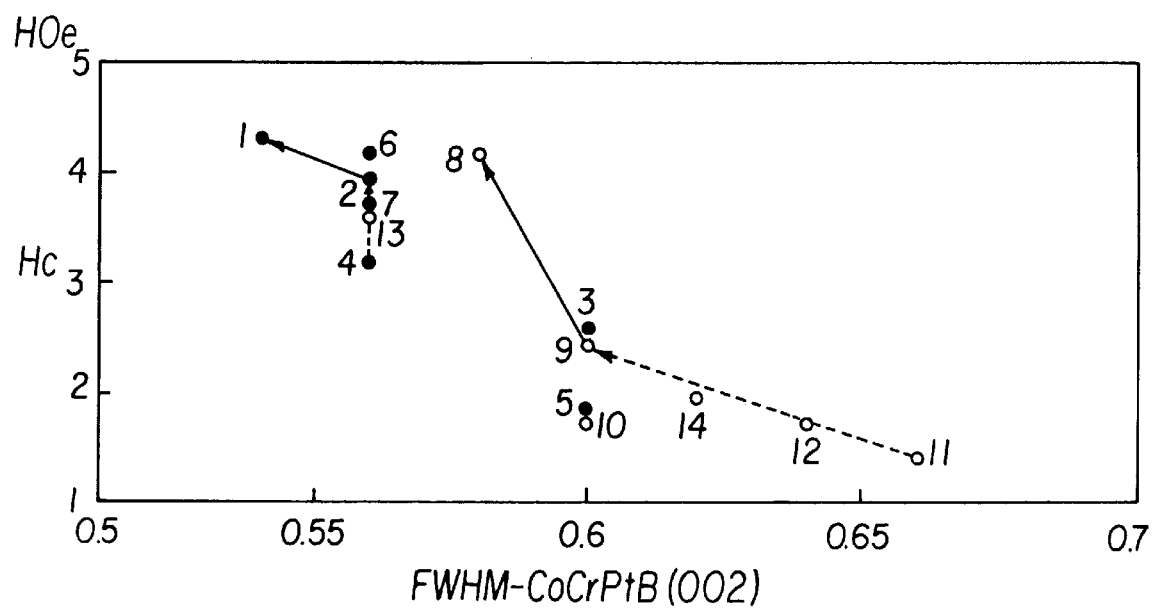
FIG. 19 is a graph showing the relationship between FWHM—CoCrPtB (002) and Hc.

The results of TABLE 2 are shown in the graph of FIG. 19 in which the axis of abscissa indicates FWHM—CoCrPtB (002), and the axis of ordinates indicates Hc. In FIG. 19, black dots represent NiAlW base films, while blank dots represent NiAl base films. Generally, Hc increases as FWHM—CoCrPtB (002) decreases. Further, FWHM—CoCrPtB (002) of NiAlW base films is generally smaller than that of NiAl base films. As typically indicated by dot-line arrows, the formation of Cr film results in an increase in Hc, and, in the case of NiAl base films, also results in a decrease in FWHM—CoCrPtB (002). If a bias voltage is applied to the substrate, FWHM—CoCrPtB (002) is reduced as typically indicated by solid-line arrows. It may be considered from these results that NiAlW base film exhibits better lattice matching with CoCrPtB magnetic film than NiAl base film, and that the application of the bias voltage to the substrate accelerates the above-described getter effect and reverse sputtering of base film, thus assuring improved crystal characteristics of CoCrPtB film (the grain size slightly increases, and the lattice distortion is reduced). These results correspond to the increase in Hc.

Comparing specimen No. 2 with No. 3, specimen No. 4 with No. 5 specimen No. 9 with No. 10, and specimen No. 11 with No. 12, it is apparent that the thickness of the base film is too small if it is 35 nm. As for the type of sputtering employed for forming the magnetic film, it is apparent from the comparison between specimen No. 1 and No. 6, No. 2 and No. 7, No. 8 and No. 13, No. 9 and No. 14 that rf sputtering is preferably used to provide better results.

As explained above, the present invention makes it possible to produce a magnetic recording medium having a high linear recording density and maintaining low noise. This invention also enables mass production of such high-quality recording media with high stability.

What is claimed is:

1. A magnetic recording medium comprising:

a non-magnetic base, and a non-magnetic metal base layer, a magnetic layer, and a protective layer, which are laminated in the order of description on said non-magnetic base, wherein said non-magnetic metal base layer comprises an alloy film formed by adding at least one element selected from the group consisting of W, Ta, Hf, Mo, Cr, Zr and Nb, to NiAl.

2. The magnetic recording medium according to claim 1, wherein said alloy film of said non-magnetic metal base layer has a composition represented as $Ni_xAl_{1-x-y}Z_y$, where $x=0.05-0.3$, $y=0.01-0.08$: atomic concentration, Z is said at least one element selected from the group consisting of W, Ta, Hf, Mo, Cr, Zr and Nb, and y is a sum of atomic concentrations of all of said at least one element.

3. The magnetic recording medium according to claim 1, wherein said non-magnetic base comprises a glass substrate.

4. The magnetic recording medium according to claim 1, wherein said non-magnetic substrate comprises a glass substrate, and one of a Cr thin film and a Cr/Al thin film which is formed on a surface of the glass substrate.

5. A method for manufacturing a magnetic recording medium comprising the steps of:

forming a non-magnetic base, and laminating a non-magnetic metal base layer, a magnetic layer, and a protective layer in the order of description on said non-magnetic base, said non-magnetic metal base layer being formed from an alloy film in which at least one element selected from the group consisting of W, Ta, Hf, Mo, Cr, Zr and Nb is added to NiAl.

6. The method for manufacturing a magnetic recording medium according to claim 5, wherein said alloy film of said non-magnetic metal base layer has a composition represented as $Ni_xAl_{1-x-y}Z_y$, where $x=0.05-0.3$, $y=0.01-0.08$: atomic concentration, Z is said at least one element selected from the group consisting of W, Ta, Hf, Mo, Cr, Zr and Nb, and y is a sum of atomic concentrations of all of said at least one element.

7. The method for manufacturing a magnetic recording medium according to claim 5, wherein said non-magnetic metal base layer is formed by dc sputtering, and said magnetic layer is formed by rf sputtering.

8. The method for manufacturing a magnetic recording medium according to claim 6, wherein a negative bias voltage is applied to said non-magnetic base when said non-magnetic metal base layer is formed by sputtering.

* * * * *